A. C. LAMBE.
WHEEL.
APPLICATION FILED SEPT. 23, 1912.

1,058,764.

Patented Apr. 15, 1913.

Witnesses
J. Tait,
Gertie Nicholson,

Inventor
Austin Curzon Lambe

By
Alfred H. Bratton
Attorney

UNITED STATES PATENT OFFICE.

AUSTIN CURZON LAMBE, OF TORONTO, ONTARIO, CANADA.

WHEEL.

1,058,764.  Specification of Letters Patent.  Patented Apr. 15, 1913.

Application filed September 23, 1912. Serial No. 721,795.

*To all whom it may concern:*

Be it known that I, AUSTIN CURZON LAMBE, a subject of the King of Great Britain and a Canadian citizen, residing at 233 Wright avenue, in the city of Toronto, in the county of York, in the Province of Ontario, Dominion of Canada, have invented certain new and useful Improvements in Wheels, of which the following is a specification.

This invention relates to wheels and more particularly to that type in which wedges are used for tightening up the spokes.

The main object of my invention is to provide a simple and effective means whereby the tightening up of the wheels is brought about without the necessity of reducing the felly and retiring the wheel, while at the same time enabling said wheels to be readily taken to pieces, easily repaired, and reassembled with facility.

A further object of my invention is to provide means whereby the spokes may be firmly adjusted and locked against either lateral or longitudinal displacement so long as the several parts of the wheel are assembled.

A still further object is to provide means whereby in the event of injury or breakage to any of the parts, the injured or broken part can be expeditiously removed and replaced by a perfected part and the whole easily and rapidly reassembled.

With these and other objects in view, as will be apparent from the following description, the invention consists essentially in the novel construction, arrangement and combination of parts hereinafter fully described and pointed out by the appended claims.

Figure 1:
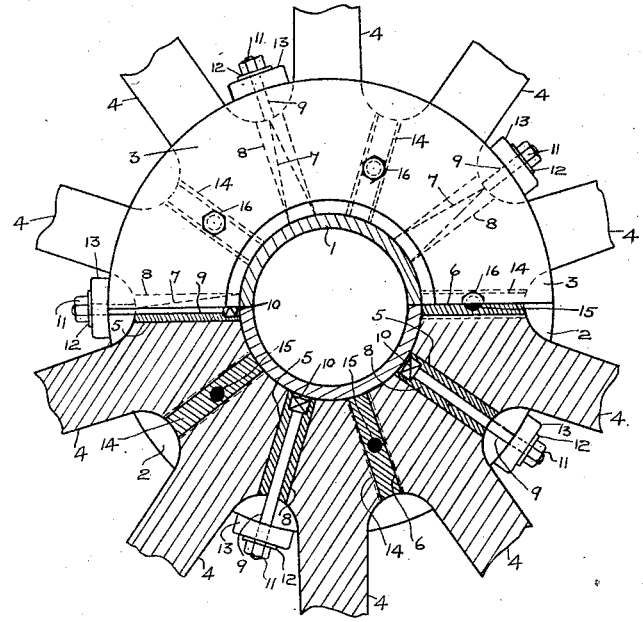
Figure 2:
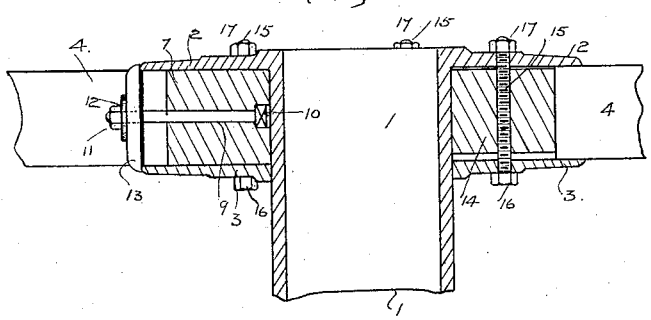

The accompanying sheet of drawings is in illustration of my invention:—Figure 1, being a fragmentary side elevation of the nave of a wheel embodying my improvements, the lower part being broken away or in section for the sake of clearness. Fig. 2, is a similar part sectional plan of the same.

Like characters of reference designate the same parts in both figures of the drawings.

According to the form of my invention illustrated, 1, is the wheel hub with which is integrally formed the inner flange 2; and 3, is the outer or loose flange.

The shank portions 4, 4, of each spoke are made of a width to fit snugly between the flanges 2, 3, and they are formed at one side thereof with a flat side 5, which is angularly disposed with relation to the axis of the spoke, and at the opposite side with a radially flat obliquely disposed side 6.

7, 7, are wedges of appropriate material which are made with a central vertical enlargement 8, of a cross section to bed snugly into correspondingly shaped grooves or channels provided for the purpose in the adjacent faces of each alternate pair of shank ends 4, 4. Axially of the enlargements 8, there is provided a hole through which passes a bolt 9, furnished with a square head 10, that fits snugly into a correspondingly shaped recess provided for its reception at the lower or inner end of each wedge. The outer end of each bolt 9, is screw threaded to receive a nut 11, and washer 12.

13, 13, are bridge pieces which are of such a length to lie across the hub parallel with its axis and they rest upon the circumferential edges of the aforesaid flanges 2, 3; and it will thus be seen that by tightening up the nuts 11, 11, the wedges 7, 7, are drawn nearer to the bridges, whereas by slackening said nuts the wedges may be retracted therefrom.

14, 14, are axial wedges adapted to fit between the alternate obliquely and reversely disposed faces 6, 6, of the spoke ends 4, 4; and said wedges are bored and threaded to receive correspondingly threaded screw bolts 15, 15, furnished with heads 16, 16, arranged on the outside of the wheel, and lock nuts 17, 17, on the inner face thereof. These axial wedges 14, 14, may be alternately reversed, that is to say, the thinner end of one wedge may adjoin the outer flange 3, and those on each side thereof face the inner flange 2, the faces of the spoke ends being correspondingly shaped to conform therewith. Furthermore said axial wedges 14, 14, may be fashioned with enlargements as described with reference to the aforesaid wedges 7, 7, as will be self evident to those skilled in the art to which my invention pertains.

It is to be particularly noted that by adopting the arrangement and combination of parts shown and described, I am able to produce a much more rigid and reliable wheel than heretofore while the rim or tire is maintained always in dead truth with relation to the hub.

From the foregoing description and accompanying drawings it will be clearly seen that by my invention I provide an exceedingly simple, strong and durable wheel, while all the parts can be made to a standard gage or templet and thereby rendered readily interchangeable. Furthermore in case of damage or injury to any particular part, that part can be easily disconnected and repaired or replaced by a new one without dismembering the entire wheel, and I wish it clearly understood that I do not confine myself to the precise arrangement illustrated and described.

Having thus fully described my invention, what I claim as new and desire to secure by Letters Patent, is.—

1. In a wheel the combination with a plurality of spokes, each of said spokes being formed at its inner end and at one side with a flat face lying at an angle with relation to the axis of the spoke and upon its opposite side with an oblique face angularly disposed with relation to the wheel axis, a pair of spaced flanges between which the inner ends of the spokes lie, wedges disposed between the said flat faces of the spokes adapted for individual radial adjustment, and wedges arranged between the oblique faces adapted for individual adjustment parallel to the axis of the wheel, substantially as set forth for the purpose specified.

2. In a wheel the combination with a plurality of spokes, each of said spokes being formed at its inner end and at one side with a flat face lying at an angle with relation to the axis of the spoke, and upon its opposite side with an oblique face angularly disposed with relation to the wheel axis, a pair of spaced flanges between which the inner ends of the spokes lie, wedges disposed between the said flat faces of the spokes adapted for individual radial adjustment, and wedges arranged between the oblique faces alternately in reverse directions said latter wedges being adapted for individual adjustment parallel to the axis of the wheel, substantially as set forth for the purpose specified.

3. In a wheel the combination with a plurality of spokes, each of said spokes being formed at its inner end and at one side with a flat face lying at an angle with relation to the axis of the spoke, and upon its opposite side with an oblique face angularly disposed with relation to the wheel axis, a pair of spaced flanges between which the inner ends of the spokes lie, wedges disposed between the said flat faces of the spokes, means supported from said flanges for drawing said wedges radially outward wedges arranged between the oblique faces, and means for drawing said wedges axially outward toward the outer flange substantially as described and shown for the purpose specified.

4. In a wheel the combination with a plurality of spokes, each of said spokes being formed at its inner end and at one side with a flat face lying at an angle with relation to the axis of the spoke, and upon its opposite side with an oblique face angularly disposed with relation to the wheel axis, a pair of spaced flanges between which the inner ends of the spokes lie, wedges disposed between the said flat face of the spokes, means supported from said flanges for drawing said wedges radially outward, wedges capable of individual movement arranged between the oblique faces, means for drawing each of said wedges transversely to the wheel and toward one of said flanges, said last named wedges being arranged alternately in reverse directions, and said transversely adjustable wedges being alternately disposed with relation to said radially movable wedges.

Signed at Hamilton, Ontario, Canada, this 18th day of September, A. D. 1912.

AUSTIN CURZON LAMBE.

In the presence of—
ALFRED T. BRATTON,
GERTIE NICHOLSON.

---

Copies of this patent may be obtained for five cents each, by addressing the "Commissioner of Patents, Washington, D. C."